United States Patent
Stanoi et al.

(10) Patent No.: US 7,174,328 B2
(45) Date of Patent: Feb. 6, 2007

(54) SELECTIVE PATH SIGNATURES FOR QUERY PROCESSING OVER A HIERARCHICAL TAGGED DATA STRUCTURE

(75) Inventors: Ioana Stanoi, Bronx, NY (US); Christian Lang, New York, NY (US); Sriram Padmanabhan, Briarcliff Manor, NY (US)

(73) Assignee: International Business Machines Corp., Armonk, NY (US)

( * ) Notice: Subject to any disclaimer, the term of this patent is extended or adjusted under 35 U.S.C. 154(b) by 511 days.

(21) Appl. No.: 10/653,550

(22) Filed: Sep. 2, 2003

(65) Prior Publication Data

US 2005/0050016 A1    Mar. 3, 2005

(51) Int. Cl.
  *G06F 17/30* (2006.01)
  *G06F 12/00* (2006.01)
(52) U.S. Cl. .......................................... 707/3; 707/200
(58) Field of Classification Search .............. 707/1–10, 707/102, 200
See application file for complete search history.

(56) References Cited

U.S. PATENT DOCUMENTS 6,542,911 B2 *  4/2003  Chakraborty et al. ....... 707/206
6,738,762 B1 *  5/2004  Chen et al. ..................... 707/3
6,757,678 B2 *  6/2004  Myllymaki .................... 707/6
2004/0098384 A1 *  5/2004  Min et al. ....................... 707/3
2004/0205082 A1 * 10/2004  Fontoura et al. ............ 707/101
2005/0050011 A1 *  3/2005  Van Der Linden et al. ..... 707/3

OTHER PUBLICATIONS

Sangwon Park and Hyoung-Joo Kim ,"A New Query Processing Technique for XML Based on Signature", Proceedings of the 7th International Conference on Database Systems for Advanced Application, 2001.*
Bob McGregor ,"Practical C++", Que Publisher, Aug. 11, 1999.*

* cited by examiner

*Primary Examiner*—Mohammad Ali
*Assistant Examiner*—Shew-Fen Lin
(74) *Attorney, Agent, or Firm*—Rafael Perez, Esq.

(57) ABSTRACT

A method of utilizing one or more hints for query processing over a hierarchical tagged data structure having a plurality of nodes in a computing system having memory, the hint being positive if there is a tag accessible in top-down traversal from a child node, and otherwise negative. For each tag in the data structure, the method calculates a bitmap for a current node with all bits set to 1 and for each child node, followed by AND-ing all child bitmaps and setting a bit corresponding to a tag ID of a current tag to zero if such current tag exists. The method further sets a bit of a current tag to 0, calculates a plurality of possible non-redundant hints for each child node, and refreshes a hint list.

17 Claims, 6 Drawing Sheets

(a) Hint information at all nodes
(4/11 nodes traversed)

(b) Hint information at node 1
(5/11 nodes traversed)

(c) Hint information at node 2
(8/11 nodes traversed)

SELECTIVE PATH SIGNATURES FOR QUERY PROCESSING OVER A HIERARCHICAL TAGGED DATA STRUCTURE

BACKGROUND OF THE INVENTION

1. Field of the Invention

The present invention relates to navigation of XML documents, and more specifically to a method for creating, using, and maintaining selective path signatures called hints, selected for materialization based on their usefulness value, to aid in the navigation of XML documents.

2. Description of the Related Art

Extensible markup language (XML) documents are often represented as document object model (DOM) structures or trees. Since XPath queries (see J. Clark and S. DeRose, "*XML Path Language XPath*", 1999, found at http://www.w3.org/TR/xpath.) are evaluated by traversing these structures, a requirement of query optimization is to efficiently decrease the number of traversed nodes. The optimization task is more difficult when the query framework allows a syntax that enlarges the search space, such as wildcards and descendant queries.

To reduce the overhead of query processing, many database systems supporting XML rely on indexes. On one hand, due to space limitations, it is often not possible to maintain an exhaustive set of XML indexes. On the other hand, partial indexes are designed for access performance, and are not dynamic enough to restructure themselves in response to changing query workloads. A secondary data structure that uses very little storage space and tunes itself to address hot spots in processing can therefore be beneficial. Hotspots provide wireless local area network (LAN) service from a wide variety of public meeting areas, and they are an increasingly popular way to work and play on the go. There are currently thousands of hotspots worldwide, with new access points being added daily.

SUMMARY OF THE INVENTION

The present invention is a method for creating, using, and maintaining selective path signatures called hints to aid in the navigation of XML documents. Hints are selected for materialization based on their usefulness value. They form a flexible data structure for pruning the search space that can be used on its own or to complement existing indexes. Based on the XML document tree representation, hints discriminatingly preserve information about some of the descendents that can be reached by some of the nodes. The amount of annotation is variable, and it depends on the storage limitation set a priori, and on the efficiency of the annotation itself.

The present invention utilizes one or more hints for query processing over a hierarchical tagged data structure having a plurality of nodes in a computing system having memory, whereby the hint is positive if there is a tag accessible in top-down traversal from a child node, and otherwise negative. For each tag in the data structure, the method calculates a bitmap for a current node with all bits set to 1 and for each child node, followed by AND-ing all child bitmaps and setting a bit corresponding to a tag ID of a current tag to 0 if such current tag exists. The method further sets a bit of a current tag to 0, calculates a plurality of possible non-redundant hints for each child node, and refreshes a hint list.

The plurality of possible non-redundant hints for each child node is calculated as follows: For each bit j such that (B(current)[j]=0 and B(child)[j]=1) a determination is made if there is a need to add a hint to a list of hints by determining if a usefulness value of the hint is greater than the least useful hint in the list, followed by eliminating a least useful hint is from the list if the list is full, and adding the hint is to the list.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
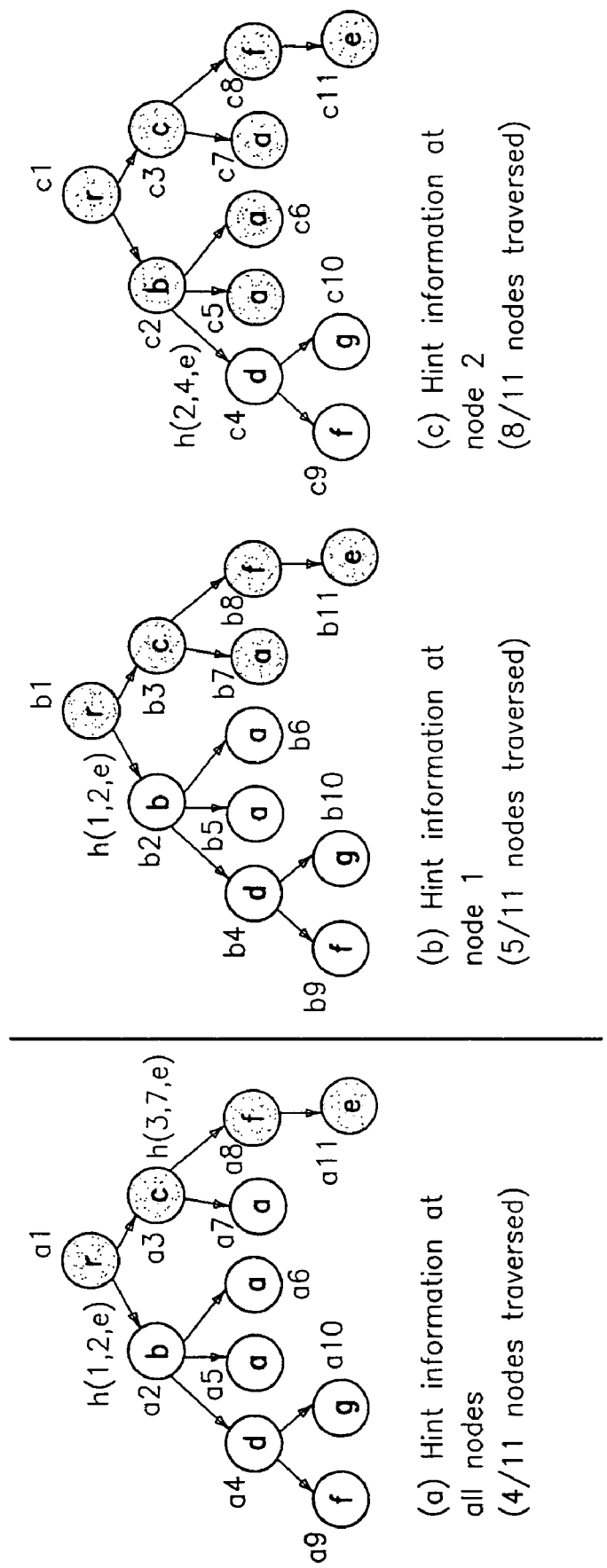
FIGS. 1(*a*), (*b*), and (*c*) are tree diagrams illustrating examples of hints of different value to the query processor.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

XPath, (see J. Clark and S. DeRose, "*XML Path Language XPath*", 1999, found at http://www.w3.org/TR/xpath.) and XQuery, (see S. Boag, D. Chamberlin, M. F. Fernandez, D. Florescu, J. Robie, and J. Simeon, "*XQuery: A Query Language For XML*", 2002, found at http://www.w3.org/TR/xquery/) provide a powerful path query syntax such as wildcard and descendant queries. To take advantage of the flexibility of these languages, the query engine needs to incorporate sophisticated optimization techniques. Since XML query languages such as XPath and XQuery use path expressions for traversals, the efficiency of navigating through XML structures is essential. In practice, to avoid the explosion of the search space for such XML documents, queries over XML data are frequently supported by path, element, or keyword indexes. In most cases, due to high storage overhead, not all possible paths or elements are indexed.

In a dynamic environment, changes in query patterns need to be captured. Partial path indexes cover only a portion of the XML document, and are not flexible enough to incrementally evolve with changing query requests. Selecting and tuning such indexes can therefore have a significant impact on the query performance. A small amount of additional information, that is designed to be maintainable and to dynamically adjust with query workload, can therefore complement existing indexing and accelerate the query processing. These units of information are called navigational aids or hints.

As an example, consider a book database and one of its schema-less XML documents where the element tagged "author" is a descendent of the element "book", and let the example query be "//book//author[last-name="Martin"]".

Because of the descendant axis ("//") that has to be matched, navigation-based processing done by an automaton that does not access indexed information, will traverse the entire XML document. During the query evaluation, the system visits all nodes that are children of the element "book" and their children's children and so on until they either lead to an element tagged "author" or a leaf node. Irrelevant paths are going to be traversed completely, and pruning is not possible. If path indexes are used, (see T. Milo and D. Suciu, "*Index Structures For Path Expressions*", Lecture Notes in Computer Science, 1540:277–295, 1999), they are usually constrained by space limitations and are not complete. Queries are then matched only partially, and navigation is used to complete their processing. In the present example, if partial path indexes match the query path up to the element "book", navigation may still be needed to match the rest of the query path "//author[last-name="Martin"]".

In general, if there is no index on all the specific tags included in the query, then the search space cannot be efficiently reduced. Moreover, even if all possible paths or elements are indexed, a large selectivity of "book" and "author" can lead to expensive processing. In this case, without additional containment information, (see C. Zhang, J. F. Naughton, D. J. DeWitt, Q. Luo, and G. M. Lohman, "*On Supporting Containment Queries In Relational Database Management Systems*", Proceedings of ACM SIGMOD International Conference on Management of Data, May 21–24, 2001, Santa Barbara, California, 2001), the query processor still has to navigate forward or backward indexes, (see R. Kaushik, P. Bohannon, J. F. Naughton, and H. F. Korth, "*Covering Indexes for Branching Path Expressions*", Proceedings of ACM SIGMOD International Conference on Management of Data, Jun. 3–6, 2002, Madison, Wis., 2002), to find the "author" elements that are descendants of "book" elements. Small navigational aids can help in this case by storing some information on the portion of the XML document not covered by indexes.

The present invention introduces navigational aids called hints, used to accelerate the traversal of XML documents. Hints can speed up processing of path queries, including those involving wildcards, and are maintained efficiently through workload changes. In addition to their ability to be selective, one advantage of hints is that they can fit into a predefined memory size. Given an upper bound on the space that can be used by hints, the system builds and stores the most useful hints that would fit in the allocated space.

Due to their flexibility, hints can complement partial indexes in the task of matching path queries, and aid them in supporting dynamic workloads more efficiently. In less sophisticated systems that lack other forms of indexing, hints can be used by themselves to reduce the cost of XML document navigation. To gather the necessary statistics, heuristics similar to those described herein are used to keep track of them dynamically, or the existence of a method that estimates the selectivity of the most commonly used path expressions is assumed.

One such technique is the XPathLearner, (see, L. Lim, M. Wang, S. Padmanabhan, J. S. Vitter, and R. Parr. "*XPath-Learner: An On-Line Self Tuning Markov Histogram for XML path Selectivity Estimation*", Proceedings of 28th International Conference on Very Large Data Bases, Aug. 20–23, 2002, Hong Kong. Morgan Kaufmann, 2002.), a self-tuning histogram that is workload-aware in collecting statistics, and adjustable on query feedback. Unfortunately, it is difficult today to take full advantage of such histograms, because existing indexes are designed for quick access to data, and are expensive to maintain through frequent updates.

For the implementation of hints, a concept similar to path signatures, (see, S. Park, Y. Choi, and H. J. Kim, "*XML Query Processing Using Signature and DTD*", Proceedings of the 3rd International Conference, EC-Web2002, Aixen-Provence, France, Sep. 2–6,2002, Proceedings, volume 2455 of Lecture Notes in Computer Science. Springer, 2002.) is used. Signatures annotate nodes in the XML document's tree representation with information about all their descendents. In contrast to path signatures, the use of selective path signatures is advocated herewith. There are a few reasons for such a choice. First, since in the inventive framework signatures are potentially used as complementary data structures, their footprint should be as small as possible. Second, as shown below, not all path signatures are equally useful and therefore it makes sense to prioritize their materialization. Finally, a non-exhaustive set of signatures is easier to maintain as its size does not increase with the number of nodes in the XML document, and it is easier to update.

The present invention brings the following contributions to path query evaluation:

Introducing a method for query processing of XML documents using navigational aids called hints. Hints can either be used as the main method to facilitate query processing, or they can complement existing access techniques.

Defining a usefulness-based method for choosing and prioritizing fragments of hint routers. The number of hint routers is bound by the space constraints assigned a priori.

While choosing only the most necessary information in signatures, the notion of necessity can be adapted to increase or reduce adaptivity to query workload.

Describing the adaptive maintenance of hints that ensures the correct and efficient navigation through workload changes and XML document updates.

The discussion above assumes the benefits of navigational hints under the assumption that a solution for schema-less XML documents is provided. If a schema exists, then the hints introduced herein can still work, given statistics about inefficient portions of the schema. For example, a schema that allows for 0 or more instances of a label, does not actually indicate if the label is present in the XML document, or how many instances are in the XML document. If a schema exists, hint routers can be adjusted to work with it. In the present invention however, it is assumed that there is no access to XML document schemas. Another assumption made, to simplify explanation, is that XML documents can be described as trees.

A. Hints

A navigation-based query processor traverses the tree representation of an XML document by following relationships between nodes. At each node, the query processor needs to know which children nodes to continue traversing and in what order. For the processing of partially qualified path queries, the performance of this step determines the difference between an efficient and an almost exhaustive traversal. The present invention is concerned with traversing the tree based on element tags and ignores the predicates in the query. The proposed solution uses exclusively the positioning and tags of elements within the XML structure, not attribute names, values, or text. The inventive system may be enhanced with additional features to improve its efficiency.

Intuitively, a hint, defined as h(l, c, t), at node location l returns Boolean information that is positive if there is a tag t in the sub-tree rooted at node c, where c is a child of l. The present invention defines the XML document structure to contain two nodes l and c such that l is a parent of c. If t does not exist, then the hint is negative. Obviously, from a complete set of positive hints one can infer the set of negative hints, and vice-versa. In the preferred embodiment, for reasons that will become clear later on in this specification, only a selection of negative hints is stored.

Referring to FIG. 1, hint information is illustrated for 11 nodes, node a1–a11 in FIG. 1(a), node b1–b11 in FIG. 1(b), and node c1–c11 in FIG. 1(c). Consider, for example, the XML document representation shown in FIG. 1(a). Then a hint h (l, n, c) is positive if there is a tag t accessible in top-down traversal from c. Otherwise h(l, n, c) is negative.

First consider the case when the system allocates unlimited memory for hints, and therefore all path information can be materialized. Some form of identifiers is assumed for all nodes, and in this example the element tags are noted inside each node a1–a11. Let the partially qualified path query be "//e". Then, if a complete set of hints can be materialized, only four nodes, a1, a3, a8, and a11 out of 11 are visited. In this case, during the traversal, negative hints h(1, 2, e), and h(3, 7, e) were accessed and helped prune out the traversal. Naturally, if all hints are available, then pruning can be optimal and only the necessary nodes are accessed.

Only negative hints are materialized, because the goal is efficient pruning of the search space. Since a negative hint h(l, c, t) guarantees that a tag t is not in the sub-tree rooted at c, then a query that includes tag t in its path can safely ignore this sub-tree. In the case where all possible hints can be stored, it does not make a difference which hints are accessed as long as the same decisions can be made during traversal. If not all hints are materialized, then a positive hint does not guarantee that paths can be safely pruned out.

A more realistic scenario is illustrated in FIGS. 1(b) and 1(c), where there are space limitations for storage of hints. The XML document has the same structure as in the previous example. As will be shown below, there is a constant size associated with hints. Then, for example, it is possible to calculate that only one negative hint can be stored in the allocated space. Consider the following two choices for the selection of this hint.

Assuming that the materialized hint is h(1, 2, e), shown in FIG. 1(b), this hint will be accessed during traversal, and five (b1, b3, b7, b8, and b11) out of 11 possible nodes will be visited.

Where the materialized hint is h(2, 4, e), shown in FIG. 1(c), then again, this hint will be accessed during the XML document navigation, and eight (c1, c2, c3, c5, c6, c7, c8), and c11 out of 11 possible tree nodes are visited.

The example that addresses space limitations, illustrates how, for the same amount of space, the selection of hints to be materialized can be crucial to the efficiency of the XML document traversal. Hints on the same tag, stored at different nodes, can bring different value to XML document traversal. Similarly, at each node, there is a difference between the usefulness of hints of different tags.

Space requirements for hints and the usefulness metric for prioritizing their selection will now be discussed. Given a memory size M, a set of hints that use space no greater than M is used to direct navigation through an XML document. The goal is to prune large sections of the XML document out of the traversal. A negative hint guarantees the nonexistence of a tag t in the sub-tree rooted at child node c of parent node l, and has value U according to some usefulness metric. A hint therefore h(l, c, t) has four fields: current node location identifier (ID) l, child ID c, tag name t and usefulness value U. To calculate the size of a hint, these fields are considered independently.

Location l is the node ID that the hint h(l, c, t) refers to. This ID does not have to reflect any structural information, e.g., a Dewey ID used to identify books and data by subject, and therefore it does not complicate the maintenance of the XML document itself. In the preferred embodiment, this field is assigned two bytes.

Child location c is the ID of the node that is a child of location l and that the hint h(l, c, t) refers to. This field is also allocated two bytes.

Tags are indexed separately and hints only store the ID or reference number of a tag. Since the exact size of the final data structure cannot be anticipated, an upper bound approximation that is refined during the selection of hints is used. This field is also allocated two bytes for the storage of the tag t.

Usefulness U represents the value of a given hint, according to the usefulness metric. The size allocated for U is two bytes.

The total size of a hint is therefore |h(l, c, t)|=|l|+|c|+|t|+|U|=8 bytes. Given that the total memory size for hints is M, then it is straightforward to calculate the upper bound on the number of hints that fit in this space:

$$k = \frac{M}{|h(l, c, t)|}$$

To access hints more efficiently, they can be hashed based on the concatenation on tag t and location l. Note that additional structures may also require some memory, and to fit everything in M the number of hints that are actually materialized needs to be reduced. In a filtering phase, k is refined by repeatedly excluding the least useful hint in the k list and measuring the total size required by the hint.

B. Usefulness Metric for Hint Selection

The value of a hint depends on the structure of the XML document as well as on the query workload and index coverage. The notion of usefulness of a hint, which is the metric used to discriminate and prioritize between hints is described here. Since usefulness combines a structural measure $sUsf_{h(\ )}$ with a semantic weight $semW_{h(\ )}$, the two criteria are defined separately. To relate the two criteria, a function such that the cumulative usefulness of a hint is $Usf_{h(\ )}=f(sUsf_{h(\ )}, semW_{h(\ )})$ is used. In the preferred embodiment the usefulness of a hint is calculated to be the following:

For a pre-defined parameter $\alpha (0 \leq \alpha \leq 1)$, the usefulness of a hint h(l, c, t), is calculated as $Usf_{h(l, c, t)}=(1+\alpha \times sem W_{h(l, c, t)}) \times sUsf_{h(l, c, t)}$, where $semW_{h(l, c, t)}$ is the semantic weight and $sUsf_{h(l, c, t)}$ is the structural usefulness of h(l, c, t).

While structural usefulness gives a default value to hints, semantic weight basically reorders the priority of different hints, by giving more value to some of them. Varying the parameter, one can give more or less precedence to structural criterion versus semantics. For example, the default setting for using only structural usefulness is when $\alpha$ is set to 0. Although the above function is implemented to measure the usefulness of a hint, there can be other appropriate functions that combine the structural and semantic components.

By default, the usefulness of a hint is based entirely on the structure of the XML document. This is especially useful when other information such as the history of the query workload is not available. The goal of using structural usefulness to define the value of a hint is that by considering an equal probability for each hint to be accessed, the system should find the top k hints that prune the most searched space. The number of hints k is calculated by dividing the total size of space allocated for hints, M, to the total size of a hint, which is described above. The structural usefulness sUsf$_{[h(l, c, t)]}$ of a hint h(l, c, t) is defined to be the number of nodes that can be pruned out the search space for a query "//t" if hint h(l, c, t) is materialized. Since the materialized hints are all negative, the structural usefulness is simply the size of the sub-tree rooted at c.

C is then defined to be the sub-tree that has node c as its root, and let |C| be the number of nodes in this sub-tree. Then the structural usefulness of a hint h(l, c, t) is measured simply as sUsf$_{[h(l, c, t)]}$=|C|.

Although all hints can now be assigned a usefulness value, this does not imply that the hints with top k usefulness form the best list of hints. If for example there are two hints in the list, and one is redundant with respect to the other, then only one of these hints should be materialized. The notion of redundancy is explained below in more detail.

Figure 2:
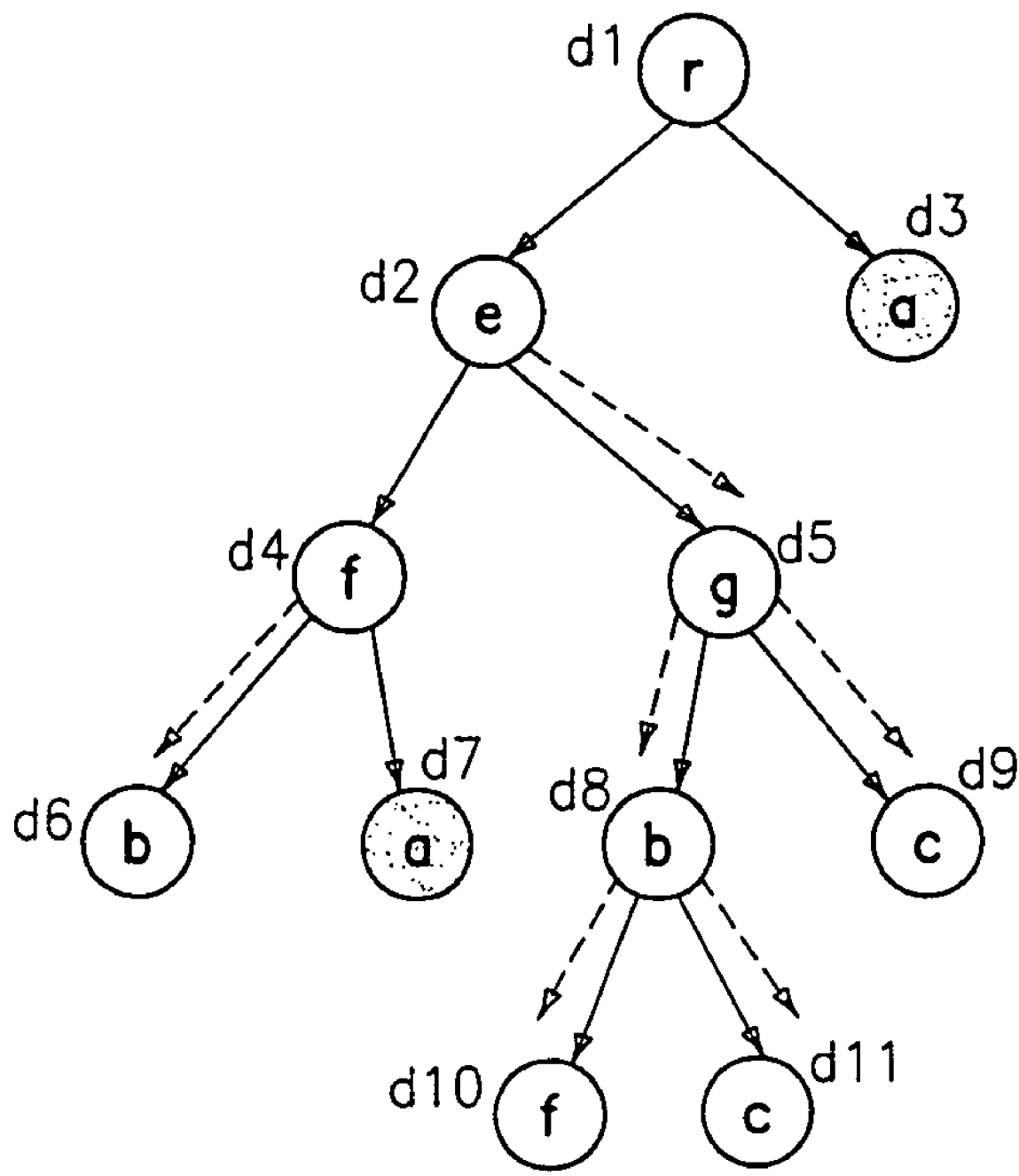
FIG. 2 is a tree diagram illustrating a data structure of an XML document having redundant hints.

In top-down traversal, if l has a negative hint h(l, c, t) then any negative hint h(c, c', t) is redundant. That is, if any paths including c and its children are excluded from traversal due to the existence of h(l, c, t), then hints h(c, c', t) will never be accessed. FIG. 2 illustrates an example of an XML document described by the data structure; hint information is illustrated for 11 nodes, node d1–d11. The dotted arrows in FIG. 2 represent all possible hints on tag a, nodes d3 and d7, where again the assumption is made that a hint is always negative. Hints h(5, 8, a) and h(5, 9, a) are redundant with respect to h(2, 5, a). Once hint h(2, 5, a) conveys the information that tag t is not in the sub-tree rooted at node d5, there is the guarantee that tag a is not reachable in any sub-tree rooted at the descendants of node d5. Moreover, since the usefulness measure depends on the size of the sub-tree that can be pruned out of the traversal, then there is always more value in materializing h(2, 5, a) over h(5, 8, a) and h(5, 9, a).

Hints h(l, c, t), h(c, c', t) are defined to be two hints where node l is the parent of node c, and c is the parent of c'. Both hints are by construction negative. Then h(c, c', t) is structurally redundant with respect to h(l, c, t) if hint h(l, c, t) is materialized.

The consequence of eliminating redundant hints is that the remaining ones are placed as high up in the structure as possible for the hint to be true. Since all hints are negative, telling the query processor where not to go to find a tag t, the hint position is at a node l where t is in the sub-tree of at least one of the siblings of l. Note that a node l has a complete set of negative hints for tag t if for each child of l there exists a negative hint on tag t. Then:

If all hints are materialized, the most useful non-redundant position l for hints on tag t is h(l, c, t) where l has a complete set of hints on t, and l's parent does not have a complete set of hints.

Returning to the example shown in FIG. 2, node d5 has a complete set of negative hints for tag t. However, node d5's sibling, node 4, leads to tag a in top-down traversal. Then the negative hint on tag a cannot be pushed any further up the tree to a position of more value, that would prune out a larger sub-tree. The resulting non-redundant hint is h(2, 5, a). It follows that, by choosing the hints h(l, c, t) with greatest usefulness value such that nodes l have a complete set of hints on t and l's parents do not, the best choice of hints for queries on tag t, according to the usefulness definition for hints. This can be checked by calculating the total number of nodes pruned out the search space if queries "//t" for all possible tags t are run.

By default, structural usefulness is used to pick k of the most useful hints. Naturally, if query workload samples are available, then some hints with less structural usefulness may be on the path that would help answer more queries, and therefore have an actual higher practical value. Integrating knowledge about query workload into the usefulness metric is done through assigning a semantic weight to hints h(l, c, t) semW$_{h(l, c, t)}$.

Because of top-down traversal, semantic weight does not render the notion of structural redundancy obsolete. This is the reason why the elimination of structurally redundant hints can be performed before calculating their total usefulness. The semantic weight differentiates between hints that are actually used and hints that are not used during a given time window. In the present invention, the semantic weight is a count of the number of times queries access a node while trying to match tag t. This count is applied to all the relevant hints on the path from the root to the node n or a leaf node. If queries are run with the existing index, then mostly the hints that do not overlap with the index coverage will automatically be promoted by the semantic weight.

The workload can be gathered by an external module, (see, L. Lim, M. Wang, S. Padmanabhan, J. S. Vitter, and R. Parr, "*XPathLearner: An On-Line Self-Tuning Markov Histogram For XML Path Selectivity Estimation*", Proceedings of 28th International Conference on Very Large Data Bases (VLDB), Aug. 20–23, 2002, Hong Kong. Morgan Kaufmann, 2002.), that takes as input the XML document structure and the query workload. Since only negative hints are stored and only statistics about which paths were accessed but did not match the query path are needed, for efficiency, a counter interlocking with the derivation algorithm, is implemented, so that the top k hints in one pass through the XML document structure can be refreshed. Many existing approaches can be used to build the necessary statistics, they will not be described herein.

C. Derivation Of The Hint Set

The derivation and selection of hints in one pass through the XML document structure is now described. First, conceptual steps of the algorithm are addressed without considering the details of the traversal.

Simple computation of top k hints:

1. Calculate all hints and their usefulness for all tags in the XML document.
2. Pick k hints with greatest usefulness, where k=M/|hint|.
3. Eliminate redundant hints.

This algorithm is clearly very inefficient. What is needed is to traverse the XML document exactly once, while keeping track of only the current top k hints that are non-redundant. For this the three stages of the simple approach are combined and executed at each step of the traversal. The list of top k non-redundant hints is maintained and updated dynamically during the traversal.

During the computation of the top k hints, each node n will maintain a bitmap B(n) with an entry for each tag value in the XML document. Each bitmap exists only for a limited amount of time: from its derivation until the bitmap of the parent's node is completed. If the bitmap entry j (B(n)[j]) is set to 0, then the tag corresponding to ID j must exist in the sub-tree rooted at node n. If the bit is set to 1, then the tag does not exist. Let the mapping between tags and their bitmap position be done by two simple lookup functions: tag(id) and tagId (tagName). Given the ID or the position in the bitmap, the tag(id) function retrieves the corresponding tag, while the reversed lookup is done by calling tagId (tagName). It is straightforward to see that the bitmap of a node is the result of AND-ing the bitmaps of its children. If the bitmaps of all children of a node n have the same bit j set to 1, then tag tag (i) is in none of the sub-trees rooted at n's children, and therefore it can be guaranteed that it is also not in the sub-tree rooted at n.

All bitmaps can be calculated through one traversal of the XML document structure. Once a bitmap at node n is completed, a set of candidate hints h(n, c, t) can be derived for all t and all children nodes c of n. A candidate hint h(n, c, t) is a hint that is non-redundant, and therefore in positions such that B(c)[tagId(t)]=1, and there is a sibling child of n with bit tagId(t) set to 0. For each of these hints, if its usefulness value is greater than that of the least useful hint in the top k list ($Usf_{[h(current, i, tag(j))]}$>minUsf), then it will replace this hint in the list.

The details of the above-described bitmap calculation are as follows:

bitmap DeriveHints(current):
1. if current is leaf node then
   (a) build bitmap B(current) with all bits set to 1
   (b) set bit of current tag to 0: B(current)[tag(current-tag)]=0.
   (c) return B(current).
2. for each child i of current ($1 \leq i \leq n$)
   (a) calculate the bitmap B(i): DeriveHints(i).
3. calculate B(current) by AND-ing all B(i): B(1) AND . . . AND B(i) AND . . . AND B(n).
4. set the bit corresponding to tagId(current) to 0 because it exists: B(current)[tagId(currentTag)]=0.
b 5. calculate possible non-redundant hints and refresh the hint list: for each child i
   (a) for each bit j such that (B(current)[j]=0 and B(i)[j]=1)
      i. if top k list is not full, then add h(current, i, tag(j)) to the top k list
      ii. else, if $Usf_{[h(current, i, tag(j))]}$>minUsf, then
         a. eliminate the least useful hint from the top k hints;
         b. add h(current, i, tag(j)) to the top k list(b)
   (b) return B(current).

The following example shows how to calculate the bitmap and derive the corresponding set of hints for a step in the XML document traversal where current is node 5.

Figure 3:
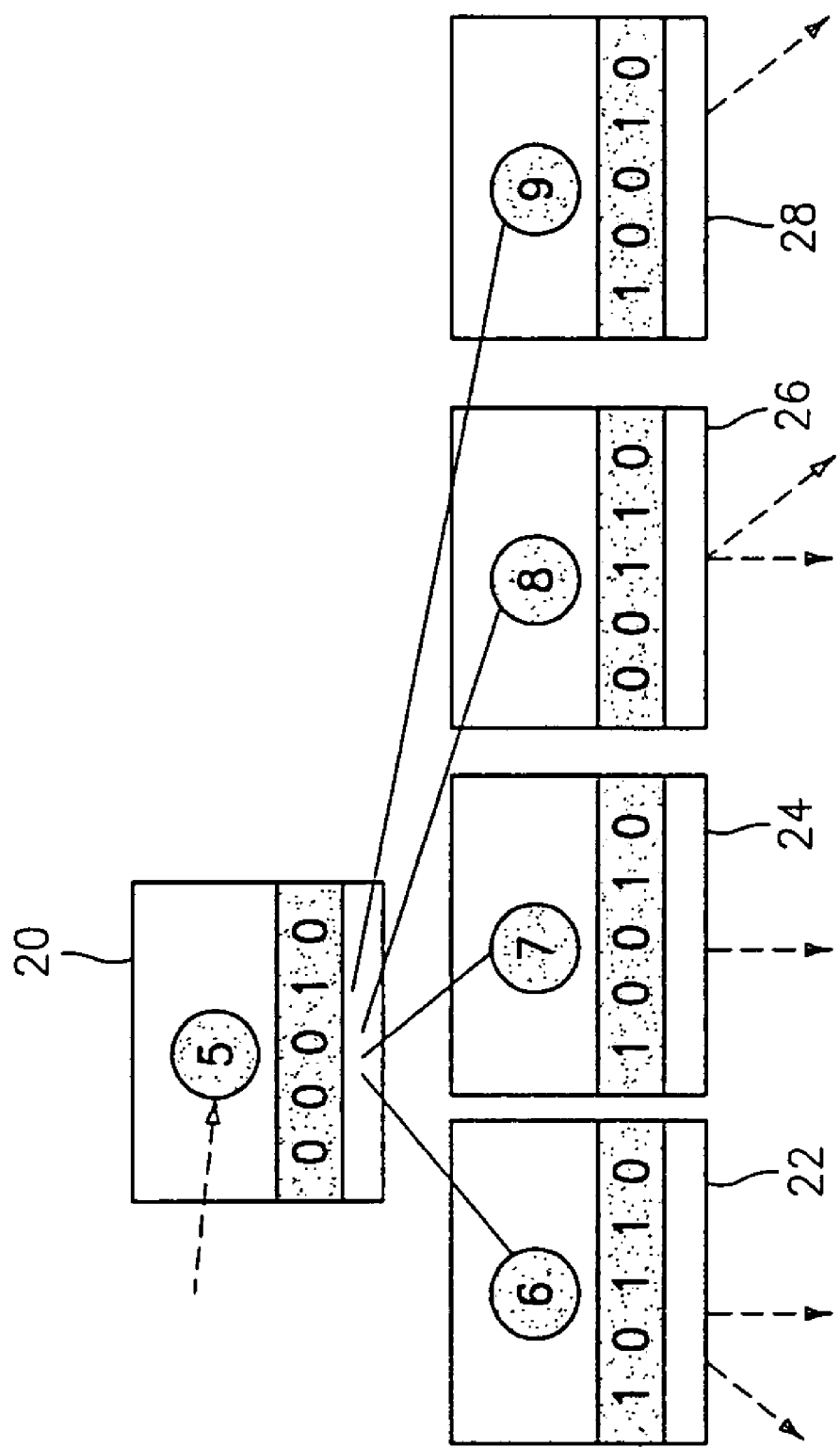
FIG. 3 is a diagram illustrating hint derivation in an XML document.

FIG. 3 illustrates hint derivation in an XML document having five nodes 20–28. Consider a section of the XML document data structure where the derivation algorithm is processing node 5 (20). To compute all the hints that might be in the top k list and are of the form h(5, child, t) for any t, the following steps have to be performed:

1. calculate all the bitmaps B(6), B(7), B(8), B(9)
2. B(5)=B(6) AND B(7) AND B(8) AND B(9)
3. set the bit corresponding to tag of node 5 to 0: B(5)[tagId(tag of 5)]=0.
4. candidates for top k hints are h(5, 6, tag(1)), h(5, 7, tag(1)), h(5, 9, tag(1)),h(5, 6, tag(3)), h(5, 8, tag(3)). These are chosen such that the child node has complete negative hints on tag(j), and there is a sibling of the child node from which tag(j) can be reached. Other hints can be "pushed up" further in the tree and therefore are not actual candidates at this step.

A method for deriving a set of top hints was described in the section above. The structural usefulness of hints may change as a result of XML document updates, and the semantic weight may also become different with a revolving query workload.

D. Maintenance

Effects that changes have on hints and an approach for the maintenance of the hint list will now be introduced. Since query workload information is used to tune the selection of hints, changes in this workload can affect the efficiency of the selected top k hints. Moreover, XML documents may be updated in time, and, as a result, the selected hints can become less efficient and possibly incorrect. The effects of modifications in query workload and in the XML document structure and methods for the maintenance of hints are discussed below.

One aspect of hint maintenance is being able to evolve with a changing query workload. In order to maintain the selection of hints incrementally to reflect the modifications in query workload, track of the semantic weight of all hints needs to be kept. In other words, for query processing only the selection of top k hints is needed, but for maintenance an exhaustive set of hints is required. Since the resulting overhead is too large, changes at a lower granularity are incorporated. The inventive maintenance method involves therefore a periodic learning phase to refresh the top k hints. During the learning phase, the system runs a portion of the workload queries, and builds logs that mark inefficient paths, described above. The distance between two hint refreshes can be given a priori by a parameter τ such that |HintRequestLog|≧τ.

Another challenge of hint maintenance is how to preserve a good selection of correct hints even through XML document updates. When an XML document is updated, an element may be deleted, inserted, or modified. It is assumed that modifications can be implemented as a delete followed by an insert operation. Also, note that inserting or deleting entire sub-trees can be reduced to updating a set of elements.

In general, there are two requirements of maintenance: efficiency and accuracy. In the present implementation, priority is given to accuracy over efficiency. As in the case of a changing workload, the improvement of efficiency is deferred by enforcing hint modifications in a periodic rather than incremental manner. By contrast, accuracy should be enforced incrementally. With every change in the XML document structure hints may become incorrect in the sense that the query processor may prune out portions of the XML document that lead to valid query answers.

Figure 4:
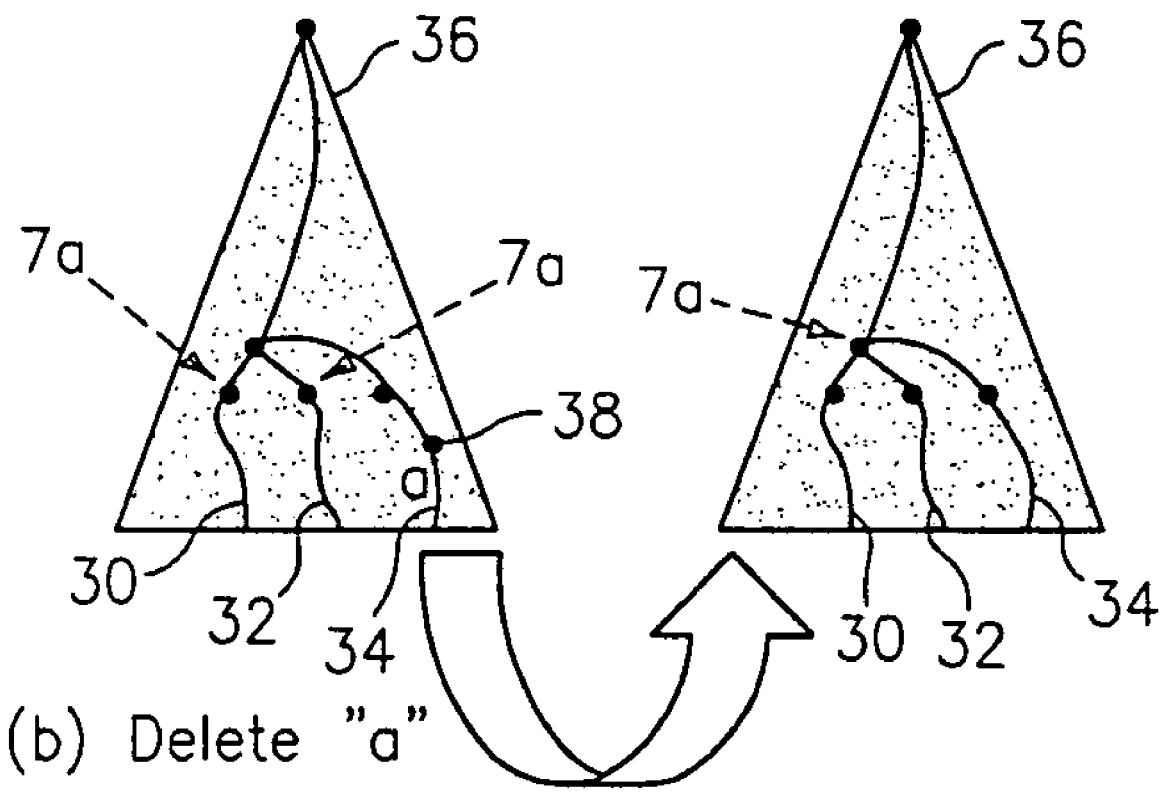
FIG. 4 is a diagram illustrating how hints are affected by deletion of nodes in an XML document.

FIG. 4 illustrates updating of hints in an XML document. Updating hints following the deletion of nodes renders hints more efficient, but it is not a requirement for accuracy. Specifically, FIG. 4 shows an example of node deletion. There are three paths shown 30, 32, and 34 for the XML document 36. Tag a can be reached through only one of them, namely path 34. If the node 38 of tag a is deleted, then for efficiency, a negative hint for node a 38 could be placed at the intersection of the paths. A query processor would then prune the sub-tree out of the traversal. However, if this hint is missing, which means the delete did not affect the choice of hints, the query processor would still process the path that used to contain tag a. Although less efficient, deletes do not render the outdated set of hints incorrect.

Figure 5:
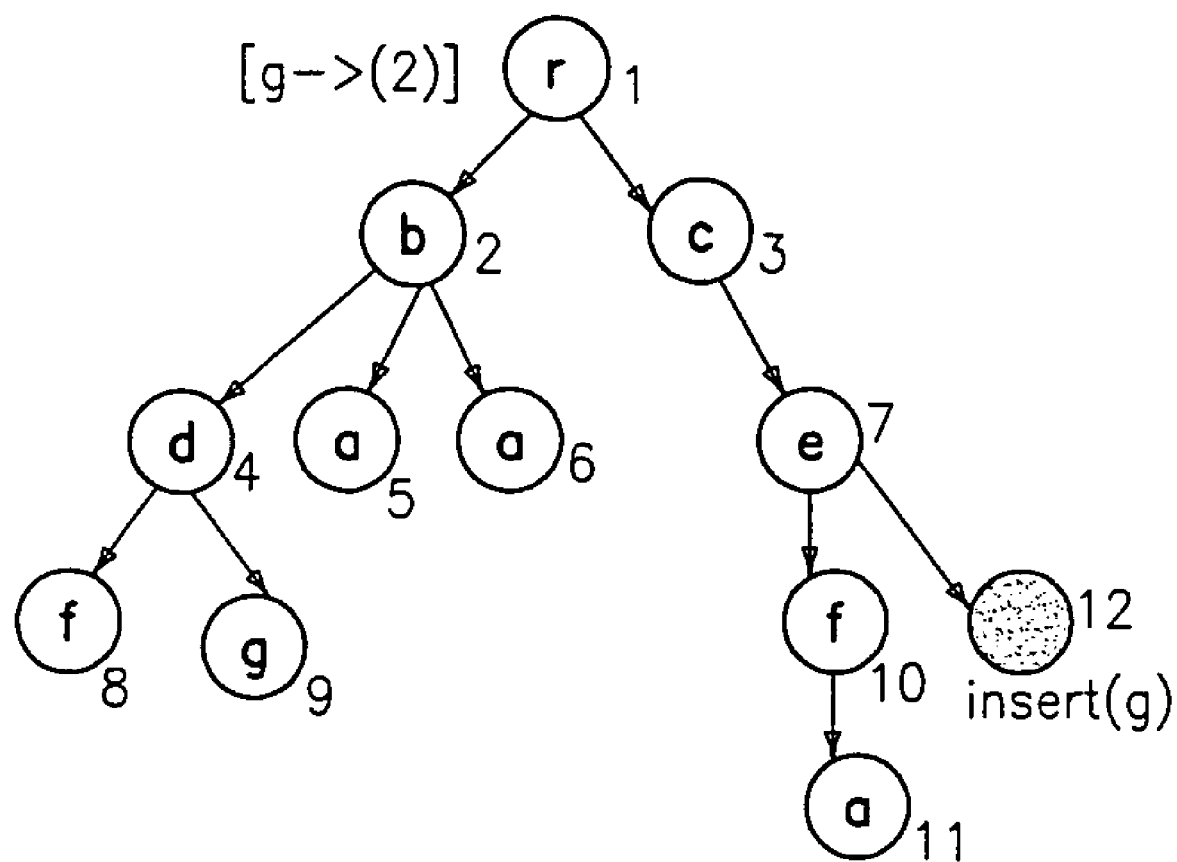
FIG. 5 is a diagram illustrating node insertion into an XML document.

By contrast, following the insert of a node n with tag a, current hints may be inaccurate. It is simple to see that, if hints are computed over an initial XML document, updates can render some of the hints obsolete. Consider an example XML document shown in FIG. 5, which illustrates insertion of a node e12 in to nodes e1–e11 of an XML document. Node e12 has a tag "g".

Assume also that there is one negative hint on tag "g", h(1, 3, g) at the root node. If hints are not modified as a consequence of inserts, then a query processor will read the hint at node 1, and follow only the sub-tree of child node 2. The sub-tree rooted at node 3 is pruned out of the search space, which for the new version of the XML document is obviously an incorrect assumption.

Figure 6:
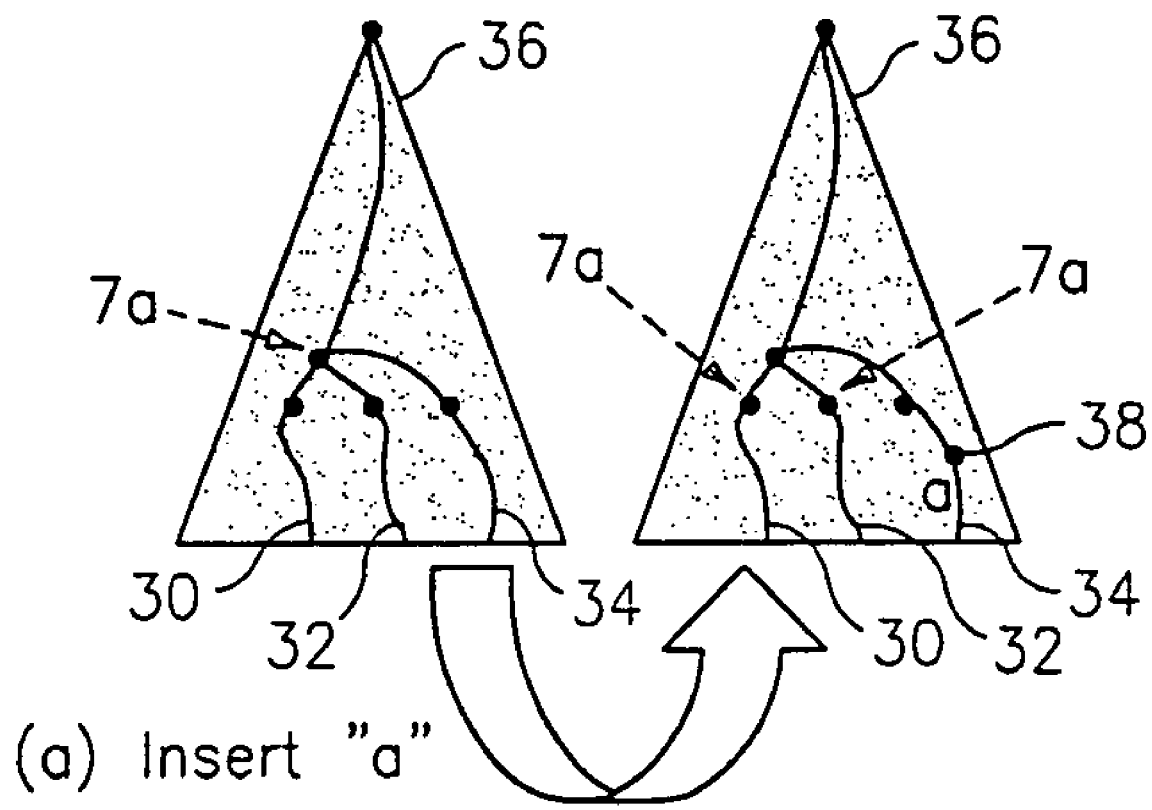
FIG. 6 is a diagram illustrating how hints are affected by insertion of nodes in an XML document.

FIG. 6 is another example of inserting tag a into the XML document. Again, there are three paths shown, and before the update none of them contains tag a. Therefore, if these are the only paths, there maybe a negative hint at their intersection. Following the insert, the existing hint becomes incorrect. It can be replaced by two hints on the two paths that still do not contain tag a.

The procedure is simple because only negative hints are maintained. To ensure correctness, the existing hints in the top k list that are affected by the change are marked as invalid. If an update inserts a node n with tag t, then:
1. for all nodes n' and n" such that n" is the parent of n', and n' is ancestor of n
    (a) if there exists h (n", n', t) in top k list the n, then
        i. mark h(n", n',t) invalid For all nodes n' and n" ancestors of n such that n" is a parent of n', if there is a hint h(n", n', a) in the top k list, mark h(n", n', a) invalid.

The above maintenance method ensures that hints pass from one correct state to another following updates. This computation is considered to be only a temporary adjustment, since a large sequence of updates can render hint routers inefficient. To avoid the quality degradation in the selection of top k useful hints, hint routers should be refreshed periodically following a number of updates.

To summarize, hints must be rendered correct following any inserts. For efficiency, refreshing of the top k list of hints can be done periodically. The refresh is triggered because the workload changes measured in the size of the HintRequestLog is greater than the set threshold $\tau$, or because the number of XML document updates reaches a preset limit.

E. Using Hints

Although hints can be used to process all queries, they are specifically designed to reduce the cost of partially qualified queries. How to make use of hint information while processing a path query over a given XML document is shown below through the steps of the recursive algorithm for handling descendant queries.

This algorithm enhances the existing navigational query processor by providing additional pruning through hints. This pruning is performed in step 3 of the generalized algorithm shown below. Function traverse( node n, query q) matches the hint information at the currently accessed node n with the remaining query path q. Function getHints( node n, tag t) returns all hints h (n,c,t) such that c is a child of n. For each such hint h(n,c,t), the sub tree rooted at c is eliminated from query processing.

Function traverse(node n, query q)
1. if q has no tags to match, return.
2. toVisit:=all children of n, where to Visit includes children of current node n to be visited in the next step of query processing.
3. for each tag t to match in q,
    a. hints:=getHints(n, t).
    b. for each hint h(n,c,t) in hints, remove c from to Visit.
4. further reduce to Visit by taking query constraints into account, e.g., "/".
5. for each child c in to Visit,
    a. Q:=set of sub queries of q corresponding to the sub tree rooted at c, where Q is a set of queries q' to be answered starting at a given child of current node n.
    b. for each query q' in Q, call traverse(c, q').

F. Related Work

To evaluate path queries, a simple algorithm that exhaustively scans the XML data is inefficient. The cost of query processing can be reduced by adapting indexes from traditional data models to semi-structured databases. In the case of relational and object-oriented databases, indexing approaches are schema-conscious, indexing on specific attributes or paths. However, for semi-structured data, it is often the case that the schema is not available. Other index structures that can be used for XML data were created for text XML documents. For the newer semi-structured data models, keyword searches have been generalized to key tree and key graph searching. An overview of such algorithm scan may be found in, D. Shasha, J. T. L. Wang, and R. Giugno, "*Algorithmics And Applications Of Tree And Graph Searching*". Symposium on Principles of Database Systems, pages 39–52, 2002.

The optimization of query processing over XML data has been a resourceful subject of study, (see, J. McHugh and J. Widom. "*Query Optimization For XML*". The VLDB Journal, pages 315–326,1999; and M. F. Fernandez and D. Suciu, "*Optimizing regular path expressions using graph schemas*". Proceedings of the 14th International Conference on Data Engineering, Feb. 23–27, 1998, Orlando, Fla., USA, pages 14–23, 1998.) Solutions specifically designed for semi-structured data focused mainly on rewriting queries based on schema information. Recently, attention has been given to the extraction of structural summaries for the purpose of improving the performance of query processing. Such index structures include DataGuides, (see, R. Goldman and J. Widom. "*Data Guides: Enabling Query Formulation And Optimization In Semi-Structured Databases*". In M. Jarke, M. J. Carey, K. R. Dittrich, F. H. Lochovsky, P. Loucopoulos, and M. A. Jeusfeld, editors, Proceedings of 23rd International Conference on Very Large Data Bases, pages 436–445. Morgan Kaufmann, 1997.) To guide the search, DataGuides use an index over existing paths in the database. Simulation, more commonly used in graph theory, has been applied to schema validation for semi-structured data, (see, M. F. Fernandez and D. Suciu, "*Optimizing Regular Path Expressions Using Graph Schemas*". Proceedings of the 14th International Conference on Data Engineering, Feb. 23–27, 1998, Orlando, Fla., USA, pages 14–23, 1998.) This technique reduces the search space by query pruning and query rewriting. Later work on indexing techniques addressed the problem that existing approaches require a large amount of space and are not general enough for complex queries with several path expressions. For this reason, the T-index was introduced, (see, T. Milo and D.

Suciu, "*Index Structures For Path Expressions*". Lecture Notes in Computer Science, 1540:277–295, 1999.), where the class of paths associated with the index are specified by a template. Database objects are grouped into equivalence objects that are represented by states in an automaton.

Work that addresses the flexibility of index structures to support partial matching include APEX, (see, C. W. Chung, J. K. Min, and K. Shim, "*APEX: An Adaptive Path Index For XML Data*". Proceedings of ACM SIGMOD International Conference on Management of Data, Jun. 3–6, 2002, Madison, Wis., 2002.). Unlike most other approaches, APEX avoids storing all paths starting from the root and exploits only the frequently used paths. IndexFrabric, (see, B. Cooper, N. Sample, M. J. Franklin, G. R. Hjaltason, and M. Shadmon, "*A Fast Index For Semi-Structured Data*". Proceedings of 27th International Conference on Very Large Data Bases, January, 2001, 2001; and N. Sample, B. Cooper, M. J. Franklin, G. R. Hjaltason, M. Shadmon, and L. Cohen, "Managing Complex And Varied Data With The Index Fabric (Demo)". Proceedings of 18th International Conference on Data Engineering, 2002.), also makes use of frequent query patterns by supporting "refined paths" in addition to the "raw paths" starting from the root. Paths are encoded as strings, stored by the conventional database system. To evaluate queries, the system encodes the desired path as a search key string and performs a lookup in the index. Due to the structural aspect of usefulness, the present invention is also related to XSketch, (see, N. Polyzotis and M. Garafalakis, editors, "*Statistical Synopsis for Graph Structured XML Databases*".), where the authors propose a new approach for building statistical summaries of large XML data graphs for path-expression selectivity estimation.

Indexing is essentially used to avoid exhaustive traversal of the XML documents for query processing. Signature-based techniques have the same goal of reducing the search space. Signatures have been used more frequently in information retrieval, to access text data, (see, C. Faloutsos and S. Christodoulakis, "*Signature Files: An Access Method For XML Documents And Its Analytical Performance Evaluation*". ACM Transactions on Information Systems (TOIS), 2(4): 267–288, 1984; and C. Faloutsos and S. Christodoulakis. *Optimal Signature Extraction And Information Loss*". TODS, 12(3): 395–428, 1987.) These solutions have been recently adapted to XML data, (see, S. Park, Y. Choi, and H. J. Kim, "*XML Query Processing Using Signature And DTD*". Proceedings of the 3rd International Conference, EC-Web2002, Aixen-Provence, France, Sep. 2–6, 2002, Proceedings, volume 2455 of Lecture Notes in Computer Science. Springer, 2002; and S. Park and H. J. Kim, "*A New Query Processing Technique For XML Based On Signature*". Proceedings of the 7th International Conference on Database Systems for Advanced Applications (DASFAA 2001), 18–20 Apr. 2001 Hong Kong, China. IEEE Computer Society, 2001.) In their approach, each node of the XML tree is annotated with a bit wise "ORing" of the hash values of its child nodes. The existence of a tag in the sub-tree of a node can therefore be estimated by comparing the hashed value of the child tag with the signature of the node. Updates may however lead to the re-computation of signatures of all ancestors and therefore the traversal of the entire XML tree. By selectively deciding which signature fragments to materialize, the cost of storage and maintenance is reduced. Naturally, incomplete access information leads to sub-optimal traversal. There is a difference between how useful different signatures are and these differences are used to prioritize their materialization.

By contrast to previous approaches, hint routers convey only partial information, chosen as a function of storage limitation, XML document structure, and query processing statistics. The advantage of hint routers over previous approaches is their flexibility. The selection criterion for the materialization of hints can adapt to take into account the requirements of the database system. If query workload statistics are available, then this knowledge can become a factor in the hint selection. If the database system is already sophisticated enough to have an index mechanism in place, then hint routers can be tuned to "fill the gap" where indexes are inefficient. Thus, hint routers can be implemented as an efficient stand-alone optimization method, or complement and enhance existing indexes.

Hints may be used in conjunction with attribute values. One way to incorporate attribute values into hints is by adding a special field that encodes the range ID of the value. Another way is to assign an additional Bloom filter to hints, and thus preserve information on values that are present in the sub-tree.

Similarly, since workload is used to give more value to some hints, use can be made of the dependencies between tags. That is, tags present in one query lead to an interdependent set of hints. To take into account such dependencies, the present invention may be modified. The extension that can be brought to the present approach to include dependencies between hints, involves a change in the usefulness measure as well as in the selection of hints. The usefulness of a set of hints is still measured as the number of nodes pruned out, but it is not a straightforward addition of values of independent hints because of possible overlaps. Also, since the size of different sets of hints varies, the procedure used in the derivation of hints may differ from the one described above.

The above description is given by way of example only. Changes in form and details may be made by one skilled in the art without departing from the scope of the invention as defined by the appended claims.

We claim:

1. A method for processing queries of hierarchical tagged data using hints, said hints being navigational aids and said processing being performed on a computing device, the method comprising:
    providing a plurality of hints for the hierarchical tagged data, said data having a plurality of nodes l and c such that l is a parent of c;
    pruning the hierarchical tagged data using said plurality of hints to avoid unnecessary navigation when processing said queries;
    updating said hints in accordance with required navigation workload and updates and changes to the hierarchical tagged data;
    providing a usefulness matrix for calculating a usefulness of each of said hints, wherein for a pre-defined parameter $0 \leq \alpha \leq 1$, the usefulness of the hint is calculated as $Usf_{h(l, c, t)} = (1 + \alpha \times semW_{h(l, c, t)}) \times sUsf_{h(l, c, t)}$, where $semW_h(l, C, l)$ is a semantic weight and $sUsf_{h(l, c, t)}$ is a structural usefulness of the hint;
    selecting hints according to limitations on an allocated memory size of said computing device and the usefulness of the hint; and
    storing the selected hints for querying processing.

2. The method of claim 1, wherein the hint being represented as h(l, c, t), where t is a tag of a child node accessible in top-down traversal from c, said hint being positive if t exists and otherwise negative.

3. The method of claim 1, further comprising the steps of:
    matching hint information at a currently accessed node n with a remaining query path q;
    analyzing all hints where c is a child of node n; and
    eliminating from future query processing a sub tree rooted at each child c of node n having a tag t.

4. The method of claim 1, further comprising the steps of:
   a) for every query path q, identifying all children c of a current node n having a tag t;
   b) for each tag t to match in said query path q, determining all hints such that c is a child of n;
   c) eliminating from query all said children c of said current node n having said tag t;
   d) determining a query constraints and further reducing said children c having said tag t in accordance with said constraints;
   e) for each said child c having said tag t, setting sub queries q' corresponding to a sub tree rooted at said child c having said tag t, and
   f) repeating steps (a) through (e).

5. A method of utilizing one or more hints for query processing over a hierarchical tagged data structure in a computing system having memory, the data structure having a plurality of nodes l and c such that l is a parent of c, the hint, represented as h(l, c, t), being positive if there is a tag t accessible in top-down traversal from c and otherwise negative, said method comprising steps of:
   for each tag in an XML document, the computing system:
   calculating and storing each hint and a usefulness of each hint;
   selecting a number of hints k having a greatest usefulness, where k equals a total memory size divided by a size of the hint;
   providing a usefulness matrix for calculating a usefulness of each of said hints, wherein for a pre-defined parameter $0 \leq \alpha \leq 1$, the usefulness of the hint is calculated as $\text{Usf}_{h(l, c, t)} = (1 + \alpha \times \text{semW}_{h(l, c, t)}) \times \text{sUsf}_{h(l, c, t)}$, where $\text{semW}_{h(l, c, t)}$ is a semantic weight and $\text{sUsf}_{h(l, c, t)}$ is a structural usefulness of the hint; and
   eliminating redundant hints.

6. The method of claim 5, wherein said structural usefulness of the hint corresponds with a number of nodes of said data structure that can be pruned out the search space for a query "//t" if the hint is materialized.

7. The method of claim 5, wherein only negative hints are used.

8. A method of utilizing one or more hints for query processing over a hierarchical tagged data structure in a computing system having memory, the data structure having a plurality of nodes l and c such that l is a parent of c, the hint represented as h(l, c, t), being positive if there is a tag t accessible in top-down traversal from a child node and otherwise negative, said method comprising steps of:
   for each tag in the data structure, the computing system:
   (a) calculating a bitmap for a current node B(current) with all bits set to one;
   (b) setting a bit of a current tag B(current)[tag(current-tag)] to zero;
   (c) calculating a plurality non-redundant hints for each child node;
   (d) providing a usefulness matrix for calculating a usefulness of each of said hints, wherein for a pre-defined parameter $0 \leq \alpha \leq 1$, the usefulness of the hint is calculated as $\text{Usf}_{h(l, c, t)} = (1 + \alpha \times \text{semW}_{h(l, c, t)}) \times \text{sUsf}_{h(l, c, t)}$, where $\text{semW}_{h(l, c, t)}$ is a semantic weight and $\text{sUsf}_{h(l, c, t)}$ is a structural usefulness of the hint; and
   (e) refreshing a hint list and the usefulness of each of said hints.

9. The method of claim 8, wherein step (a) further comprises the steps of:
   calculating a bitmap for each child node of said current node;
   AND-ing all said bitmaps for each child node; and
   setting a bit corresponding to tag ID B(current)[tagid(current-tag)] of a current tag to zero if said current tag exists.

10. The method of claim 8, wherein step (c) further comprises the steps of:
    for each bit j such that B(current)[j] is equal to zero and B(child)[j] is equal to one:
    (c1) determining if there is a need to add a hint h(current node, current child, tag(j)) to a list of hints;
    (c2) eliminating a least useful hint from said list if said list is full; and
    (c3) adding said hint to said list.

11. The method of claim 10, wherein step (c1) further comprises the step of determining if a usefulness value Usf[h(current node, current child, tag(j))] of said hint is greater than the least useful hint in said list.

12. The method of claim 8, wherein only negative hints are used.

13. A computer program device readable by a machine, tangibly embodying a program of instructions executable by the machine to perform method steps for utilizing one or more hints for query processing over a hierarchical tagged data structure in a computing system having memory, the data structure having a plurality of nodes l and c such that l is a parent of c, the hint, represented as h(l, c, t), being positive if there is a tag accessible in top-down traversal from a child node, and otherwise negative, said method comprising steps of:
   for each tag in the data structure, the machine using the computer program device for:
   (a) calculating a bitmap for a current node B(current) with all bits set to 1;
   (b) setting a bit of a current tag B(current)[tag(current-tag)] to zero;
   (c) calculating a plurality non-redundant hints for each child node;
   (d) providing a usefulness matrix for calculating a usefulness of each of said hints, wherein for a pre-defined parameter $0 \leq \alpha \leq 1$, the usefulness of the hint is calculated as $\text{Usf}_{h(l, c, t)} = (1 + \alpha \times \text{semW}_{h(l, c, t)}) \times \text{sUsf}_{h(l, c, t)}$, where $\text{semW}_{h(l, c, t)}$ is a semantic weight and $\text{sUsf}_{h(l, c, t)}$ is a structural usefulness of the hint; and
   (e) refreshing a hint list and the usefulness of each of said hints.

14. The method of claim 13, wherein step (a) further comprises the steps of:
    calculating a bitmap for each child node of said current node;
    AND-ing all said bitmaps for each child node; and
    setting a bit corresponding to tag ID B(current)[tagid(current-tag)] of a current tag to zero if said current tag exists.

15. The method of claim 13, wherein step (c) further comprises the steps of:
    for each bit j such that B(current)[j] is equal to zero and B(child)[j] is equal to one
    (c1) determining if there is a need to add a hint h(current node, current child, tag(j)) to a list of hints;
    (c2) eliminating a least useful hint from said list if said list is full; and
    (c3) adding said hint to said list.

16. The method of claim 15, wherein step (c1) further comprises the step of determining if a usefulness value Usf[h(current node, current child, tag(j))] of said hint is greater than the least useful hint in said list.

17. The method of claim 14, wherein only negative hints are used.

* * * * *